United States Patent Office 3,483,275
Patented Dec. 9, 1969

3,483,275
HIGH IMPACT POLYVINYL HALIDE COMPOSITIONS
Jacques A. Waterman and Jan Selman, Amsterdam, Netherlands, assignors to Shell Oil Company, New York, N.Y., a corporation of Delaware
No Drawing. Filed Mar. 17, 1966, Ser. No. 535,051
Claims priority, application Netherlands, Mar. 23, 1965, 6503697
Int. Cl. C08f 41/12, 29/36
U.S. Cl. 260—890                                    7 Claims

ABSTRACT OF THE DISCLOSURE

High impact, age-resistant polymers of vinyl halides are disclosed. These polymers comprise a mixture of polymers of a vinyl halide and a hydrogenated copolymer of a conjugated diolefin and an ester of an unsaturated polybasic aliphatic carboxylic acid.

---

This invention relates to high impact and age resistant polymers containing polar groups. More particularly, the invention relates to high impact and age resistant polymer compositions comprising a mixture of a thermoplastic polar group containing homopolymer or copolymer and a hydrogenated copolymer of a conjugated diolefin and an ester of an unsaturated aliphatic carboxylic acid.

Homopolymers and copolymers of vinyl halides, vinylidene halides, acrylic and methacrylic esters, acrylonitrile and vinyl esters such as, for example, vinyl pivalate make up a group of widely used polar group containing thermoplastic resins. These materials are durable, weather and solvent resistant and have other desirable qualities which make them suitable for a variety of applications. Generally, however, these polymers are brittle, inflexible and not resistant to impact.

It is known that certain copolymers of conjugated diolefins impart impact resistance to polar group-containing polymers. For example, U.S. Patent 2,719,137 discloses the use of copolymers of a conjugated diolefin and an acrylic ester as increasing the impact resistance of polyvinyl chloride and U.S. Patent 2,779,748 discloses that a copolymer of butadiene and dialkyl fumarate lends high impact properties to polyvinyl chloride. In addition, copending application Ser. No. 528,820, filed Feb. 21, 1966, discloses improved high impact polyvinyl halide and polyvinylidene halide compositions containing a copolymer of a conjugated diolefin and an ester of a polybasic propylene carboxylic acid. However, an undesirable characteristic of these high impact polymer compositions is that the initial impact resistance deteriorates with age.

The compositions of this invention comprising a major amount of a thermoplastic polymer containing polar groups and a minor amount of a hydrogenated copolymer of a conjugated diolefin and an ester of an unsaturated aliphatic carboxylic acid have greatly increased resistance to aging.

The polymer present in major amounts in the compositions of the invention are thermoplastic polymers and copolymers containing polar groups. Polymers which are contemplated include polymers and copolymers of vinyl halides, vinylidene halides, acrylic and methacrylic acid esters, acrylonitrile, vinyl pivalate, etc. Preferred are the polymers of vinyl halide or vinylidene halides or copolymers thereof. Thus, the preferred polymers include polyvinyl chloride, polyvinyl fluoride, polyvinylidene chloride, polyvinylidene fluoride, copolymers of vinyl chloride and vinyidene chloride, etc. Especially preferred is polyvinyl chloride.

The hydrogenated copolymers are those comprising at least 30% by weight of a conjugated diolefin and at most 70% by weight of an ester of an unsaturated aliphatic carboxylic acid and preferably an unsaturated aliphatic polyvalent carboxylic acid ester and more preferably wherein the ester content is between about 10 and 50% by weight.

Diolefins used in the copolymers are the conjugated diolefins of from 4 to about 8 carbon atoms such as butadiene - 1,3, isoprene, piperylene, dimethylbutadiene - 1,3- methylpentadiene, etc. Butadiene-1,3 is preferred.

The polybasic carboxylic acid esters are those in which one or more of the carboxyl groups have been esterified. The remaining groups may be esterified or free acid groups or the metal salts thereof such as an alkali metal carboxylate. Ester groups may be alkyl, cycloalkyl or aromatic. Preferred are alkyl ester groups of from one to five carbon atoms. Suitable acids are the ethylene dicarboxylic acids such as fumaric and maleic acid. Especially preferred esters are those of polybasic propylene carboxylic acids of which at least one carboxyl group is attached to a saturated carbon atom and at least one carboxyl group is attached to an unsaturated carbon atom of the propylene moiety. The polybasic propylene carboxylates may also be substituted on one or more of the carbon atoms of the acid portion of molecule with alkyl groups of from one to five carbon atoms. Preferred esters are those of propylene di- and tricarboxylic acids such as aconitic acid, itaconic acid, glutaconic acid, isaconitic acid, mesaconic acid and citraconic acid. The most preferred esters are the full methyl or ethyl esters of these acids.

Where transparent products are desired such as in the preparation of bottles and the like, it has also been found advantageous according to one embodiment to copolymerize in addition to the conjugated diene and the ester, a vinyl aromatic such as styrene, alpha-methylstyrene, vinylnaphthalene, vinyl toluene and 1,1-diphenylethane. In this manner, by replacing a portion of the conjugated diene in the copolymer with the vinylaromatic and particularly where the diene is present in relatively large amounts as compared to the ester, due to differences in refractive indices of the monomers transparent products are obtained.

The diene-ester copolymers may be prepared by any suitable method such as by emulsion or solution polymerization in the presence of free radical initiator or organometallic catalyst compositions such as alkali metal compositions and the like as are well known to those skilled in the art. Where the monomers are liquid no diluent is necessary, but where the monomers are solid at polymerization temperatures, such as dimethyl itaconate or dimethyl fumarate, an inert hydrocarbon solvent for the esters such as benzene should be used.

It has also been found according to one embodiment of the invention that particularly desirable products are obtained where diene ester copolymers are of certain molecular weights which correspond to certain plasticity values. Thus, it is especially desirable to use unhydrogenated copolymers having a Hoekstra plasticity value between about 5 and 50 as determined by the method set forth in Rubber and Plastics Age, 42, 1079 (1961) at a loading time of 30 seconds. The plasticity values set forth herein are determined by this method.

The diene-ester copolymers may be hydrogenated by suitable hydrogenation techniques using known hydrogenation catalysts and conditions which do not cause significant reduction of the functional groups of the copolymers. Suitable catalysts include metallic nickel or cobalt, preferably supported on an inert carrier such as silica gel or kieselguhr. Preferred catalysts are those prepared by reacting an organo-metallic compound such as an aluminum trialkyl with an organic compound of a Group VIII metal and preferably nickel, cobalt or iron and in particular where the metals are in bivalent form. Nickel is especially preferred. These compounds include, for example, 3,5 - di - isopropyl salicylates, 2-ethyl hexoates, naphthenates, acetyl acetonates, etc. Many of these catalysts components are soluble in organic solvents and thus the hydrogenation reaction may be performed at temperatures between about 20 and 50° C. at hydrogen pressures of between about 1 and 5 atmospheres.

The compositions of the invention comprise a major amount of the thermoplastic polar group containing polymers and a minor amount of the hydrogenated copolymers. The amounts of copolymers between about 3 and 60% by weight based on the thermoplastic polymer is satisfactory with between 5 and 25% by weight based on the thermoplastic polymer being preferred.

The thermoplastic polymers are those which may be prepared by any convenient method such as by emulsion or suspension polymerization techniques as are well known to those skilled in the art. The thermoplastic polymers and the hydrogenated copolymers may be conveniently mixed by combining the solid dry products at elevated temperatures in mixing apparatus such as a rolling mill. It is preferred to mix a portion of the thermoplastic polymer at relatively low temperatures followed by blending the remainder at high temperatures. Prior to mixing of the polymer components, it is desirable to add stabilizers to the respective polymer compositions.

In order to illustrate the preparation of the compositions of the invention and the properties thereof the following examples are provided. Unless otherwise stated, parts and percents are given by weight. The diene-ester copolymers were prepared by emulsion polymerization at 5° C. The polymerization mixture consisted of the following components with parts expressed per 100 parts by weight of the combined monomer weight.

| | Parts |
|---|---|
| Butadiene+ester | 100 |
| p-Methane hydroperoxide (catalyst) (pure peroxide) | 0.12 |
| Tert-dodecyl mercaptan | 0.10–0.40 |
| Emulsifier solution consisting of: | |
| Water | 190 |
| Alkali metal rosin acid soap (Dresinate 515—Hercules Powder Co.) 80% | 4.7 |
| $Na_3PO_4 \cdot 12H_2O$ | 0.70 |
| Sodium alkaryl sulfonate (Tamol N—Rhom and Haas) | 0.02 |
| Disodium salt of ethylenediaminetetraacetic acid | 0.01 |
| Activation solution consisting of: | |
| $FeSO_4 \cdot 7H_2O$ | 0.04 |
| Disodium salt of ethylenediaminetetraacetic acid | 0.05 |
| Sodium formaldehyde sulfoxylate·$2H_2O$ | 0.10 |
| Water | 10 |

The amount of mercaptan used was varied between the limits as set forth above to obtain copolymers of the desired Hoekstra plasticity values. The polymerization times varied between 7 and 24 hours with conversions between 22 and 93%. In addition, except where aconitate was the ester used, a quantity of benzene equal to the amount of ester present was also added to the mixture.

The polymerization reaction was terminated by the addition of 0.15 part of a 10% aqueous solution of the sodium salt of dimethyl dithiocarbamate. The unconverted monomers and benzene were then removed from the mixture by steam treatment and the latices were coagulated with ethanol at room temperature. The copolymers were then recovered, washed and dried for 10 hours at 70° C. after which 0.5% of 1,3,5-trimethyl-2,4,6-tri(3,5-ditert-butyl-4-hydroxyphenyl) benzene stabilizer was added to the copolymers which were not to be hydrogenated. The Hoekstra plasticity values of the copolymers were then determined.

The copolymers to be hydrogenated were dissolved in cyclohexane. Where the copolymers contained more than 30% or more by weight itaconate or fumarate esters, the solvent consisted of a mixture of cyclohexane and benzene in a 3:1 volume ratio respectively.

The hydrogenation catalysts were prepared by reacting aluminum triethyl with nickel naphthenate for 4 minutes at 40° C. under hydrogen in cyclohexane solution. The nickel naphthenate concentration was 50 mmoles per liter with the ratio of Al:Ni as set forth in Table I. The catalyst solution was then added in increments to the polymer solution each increment being sufficient to increase the nickel concentration by 0.5 mmole per liter and added over a period of about 50 hours.

TABLE I

| Ester copolymerized with butadiene | Copolymer concentration in the solution before catalyst addition, g./l. solvent | Atomic ratio, Al:Ni | Number of increments |
|---|---|---|---|
| Dimethyl fumarate | 30 | 6 | 5 |
| Diethyl fumarate | 30 | 6 | 5 |
| Dimethyl itaconate | 30 | 6 | 1 5 |
| Triethyl aconitate | 14 | 4 | 4 |
| Tributyl aconitate | 14 | 4 | 4 |

[1] After addition of the first increment a gel was formed in the solution of the butadiene-dimethyl itaconate polymer, the butadiene content of which was 80%w. This gel was dissolved by adding 7.5 ml. of sec-butyl alcohol per liter cyclohexane.

The hydrogenations were carried out over a 64 hours period. The hydrogenated copolymers were worked up by adding an ethanol solution of hydrochloric acid and extracting with water until the pH of the wash water was 4. The copolymers were then washed with alkaline solution and water respectively and steam stripped at 100° C. and vacuum dried at 60° C. The polymers were mixed with 0.5% by weight 1,3,5-trimethyl-2,4,6-tri(3,5-ditert-butyl-4-hydroxybenzyl)benzene.

The copolymers were then mixed with an emulsion polymerized polyvinyl chloride polymer having a K value determined in cyclohexene at 25° C. of 70 and to which had been added 2% of a mercapto-tin stabilizer. The polymers were mixed by milling about ⅓ of the polyvinyl chloride to be used with the copolymer at 100° C. for 5 minutes followed by milling the remainder of the polyvinyl chloride at 180° C. for 5 minutes. From the polymer mixture were prepared 8 mm. thick plates for determining Izod impact resistance.

TABLE II

| Butadiene-ester copolymer | | | | Izod Impact Value, kg./cm.² | | | | | | | |
|---|---|---|---|---|---|---|---|---|---|---|---|
| | | | | 20° C. | | | | 0° C. | | | |
| | | | | Non-hydrogenated | | Hydrogenated | | Non-hydrogenated | | Hydrogenated | |
| Ester | Weight ratio butadiene/ester | Hoekstra plasticity value | Quantity of copolymer added, percent w. calc. on PVC | Before aging | After 3 mo. | Before aging | After 3 mo. | Before aging | After 3 mo. | Before aging | After 3 mo. |
| Dimethyl-itaconate | | | 0 | 12 | 11 | | | 7 | 7 | | |
| | 80/20 | 85 | 5 | 19 | 5 | 19 | 18 | 11 | 6 | 10 | 9 |
| | 80/20 | 85 | 10 | 34 | 14 | 34 | 35 | 18 | 9 | 18 | 18 |
| | 80/20 | 85 | 15 | 15 | 4 | 16 | 15 | 12 | 4 | 11 | 10 |
| | 80/20 | 40 | 10 | 60 | 18 | 62 | 59 | 26 | 13 | 23 | 24 |
| | 80/20 | 27 | 10 | 70 | 22 | 68 | 67 | 31 | 15 | 30 | 27 |
| Dimethyl-itaconate | 70/30 | 58 | 5 | 25 | 16 | 24 | 22 | 16 | 9 | 13 | 13 |
| | 70/30 | 58 | 10 | 35 | 18 | 36 | 35 | 23 | 12 | 22 | 21 |
| | 70/30 | 58 | 15 | 24 | 14 | 22 | 22 | 16 | 6 | 16 | 16 |
| | 70/30 | 48 | 10 | 55 | 30 | 56 | 54 | 28 | 14 | 27 | 26 |
| | 70/30 | 30 | 10 | 60 | 33 | 58 | 57 | 29 | 14 | 28 | 27 |
| Dimethyl-itaconate | 60/40 | 50 | 5 | 17 | 12 | 18 | 17 | 11 | 7 | 11 | 11 |
| | 60/40 | 50 | 10 | 43 | 28 | 44 | 44 | 29 | 15 | 27 | 26 |
| | 60/40 | 50 | 15 | 105 | 55 | 100 | 95 | | | | |
| | 60/40 | 33 | 5 | 15 | 10 | 16 | 15 | 10 | 6 | 10 | 10 |
| | 60/40 | 33 | 10 | 53 | 30 | 55 | 53 | 28 | 15 | 26 | 25 |
| | 60/40 | 33 | 15 | 105 | 60 | 105 | 103 | | | | |
| Dimethyl-itaconate | 50/50 | 40 | 5 | 12 | 4 | 13 | 12 | 9 | 5 | 9 | 9 |
| | 50/50 | 40 | 10 | 20 | 12 | 20 | 18 | 11 | 6 | 12 | 12 |
| | 50/50 | 40 | 15 | 85 | 45 | 80 | 80 | | | | |
| | 50/50 | 26 | 5 | 12 | 5 | 12 | 10 | 8 | 6 | 8 | 8 |
| | 50/50 | 26 | 15 | 70 | 40 | 67 | 66 | 19 | 12 | 20 | 18 |
| Dimethyl-fumarate | 80/20 | 40 | 10 | 40 | 18 | 42 | 43 | | | | |
| | 70/30 | 48 | 10 | 30 | 15 | 27 | 27 | | | | |
| | 60/40 | 50 | 10 | 25 | 14 | 25 | 26 | | | | |
| Diethyl-fumarate | 40/60 | 31 | 10 | 23 | 15 | 24 | 23 | 9 | 5 | 9 | 9 |
| | 40/60 | 27 | 10 | 30 | 18 | 34 | 30 | 10 | 7 | 9 | 9 |
| | 40/60 | 27 | 15 | 80 | 60 | 75 | 72 | 26 | 16 | 26 | 25 |
| | 40/60 | 25 | 10 | 22 | 14 | 22 | 22 | 8 | 5 | 7 | 8 |
| | 40/60 | 10 | 10 | 41 | 27 | 40 | 39 | 17 | 12 | 16 | 15 |
| Triethyl-aconitate | 70/30 | 24 | 10 | 60 | 40 | 55 | 54 | 30 | 20 | 30 | 27 |
| | 60/40 | 8 | 10 | 36 | 19 | 38 | 39 | 9 | 5 | 10 | 11 |
| Tributyl-aconitate | 70/30 | 18 | 10 | 50 | 28 | 48 | 45 | | | | |

We claim as our invention:

1. A polymer composition comprising (a) a major amount of a polymer selected from the group consisting of a polyvinyl halide, a polyvinylidene halide and a copolymer of a vinyl halide and a vinylidene halide, and (b) a minor amount of a copolymer of at least 30% by weight of a conjugated diolefin and an ester of an unsaturated polybasic aliphatic carboxylic acid catalytically hydrogenated at temperatures between about 20 and 50° C. and at hydrogen pressures of between about 1 and 5 atmospheres such that the high impact properties of said polymer composition are substantially maintained over at least a three month period.

2. A composition of claim 1 wherein the amount of ester present in the copolymer is between about 10 and 50% by weight.

3. A composition of claim 1 wherein the hydrogenated copolymer is a copolymer of butadiene and an alkyl ester of an acid selected from the group consisting of an ethylene dicarboxylic acid, and a propylene dicarboxylic acid and a propylene tricarboxylic acid.

4. A composition of claim 1 wherein the ester is an ester of a polybasic propylene carboxylic acid having at least one carboxyl group attached to an unsaturated carbon atom and at least one carboxyl group attached to a saturated carbon atom.

5. A composition of claim 1 wherein the ester is an alkyl ester having from 1 to 5 carbon atoms of an acid selected from the group consisting of aconitic acid, itaconic acid and fumaric acid.

6. A composition of claim 1 wherein the ester is dimethyl itaconate.

7. A composition of claim 1 wherein the copolymer has a Hoekstra plasticity value of between 5 and 50.

References Cited

UNITED STATES PATENTS 2,619,477  11/1952  Banes et al. _____ 260—17.5
2,779,748   1/1957  Snyder _____ 260—890

FOREIGN PATENTS 621,955  6/1961  Canada.

MURRAY TILLMAN, Primary Examiner

M. J. TULLY, Assistant Examiner

U.S. Cl. X.R.

260—45.95, 78.5, 80.7, 94.7